United States Patent Office 2,773,507
Patented Dec. 11, 1956

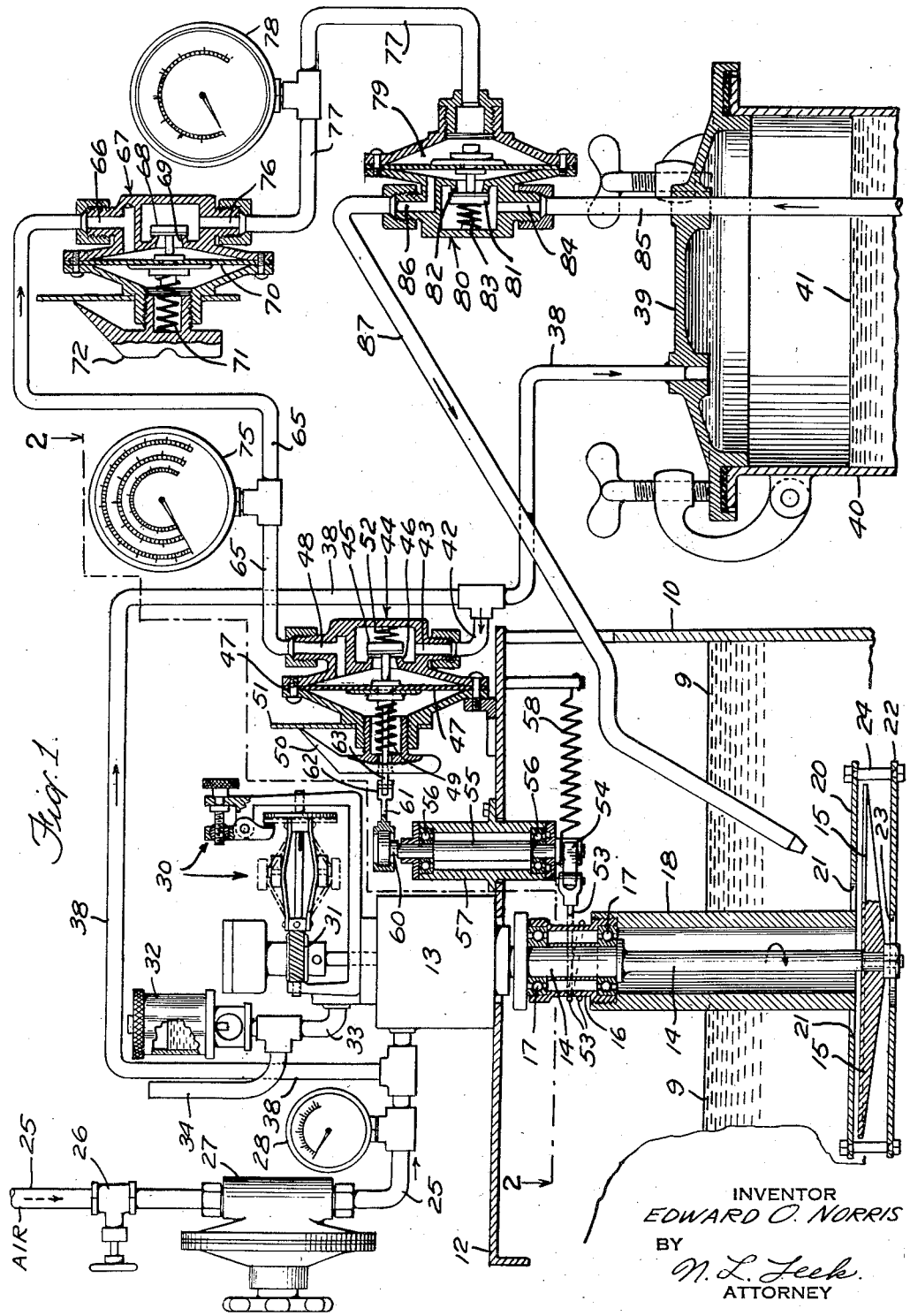

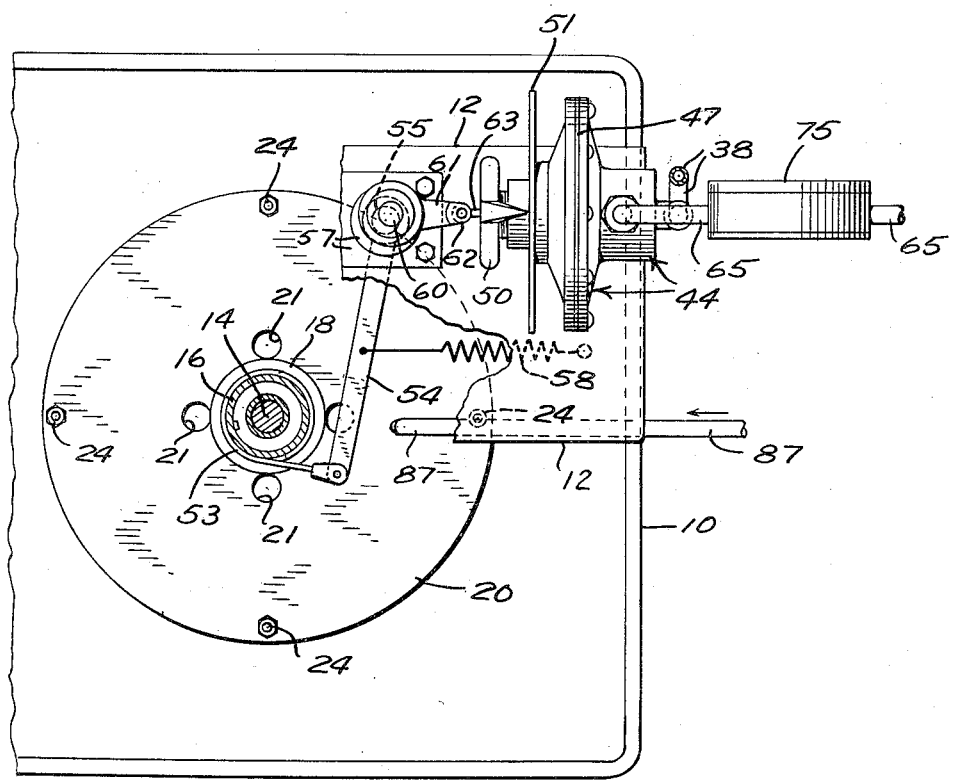

2,773,507

VISCOSITY CONTROL SYSTEM

Edward O. Norris, Westport, Conn.

Application October 4, 1954, Serial No. 460,159

5 Claims. (Cl. 137—92)

This invention relates to a system for determining and regulating the viscosity of a liquid and more particularly to a system for maintaining constant viscosity conditions in a liquid subject to changing viscosity as by the depletion of its solvent content.

The invention is particularly applicable to systems wherein a liquid is continuously recycled through a processing stage which results in an inherent viscosity change. The system is adapted to measure the viscosity continuously and to supply an additional quantity of the component which may have been lost.

An object of the invention is to provide a novel and improved system of the above type.

Another object is to provide a system of the above type which is sensitive to minor changes in viscosity and which is adapted to provide a continuous indication of the viscosity and to automatically correct any changes therein.

Various other objects and advantages will be apparent as the nature of the invention is more fully disclosed.

The invention will be better understood by referring to the following description, taken in connection with the accompanying drawings in which a specific embodiment thereof has been set forth for purposes of illustration.

In the drawings:

Fig. 1 is a diagrammatic view illustrating a system embodying the present invention; and Fig. 2 is a section taken on the line 2—2 of Fig. 1.

Referring to the drawings more in detail the liquid 9 whose viscosity of to be measured and controlled is disposed in container 10. This liquid may for example comprise a coating material such as paint in a vaporizable vehicle or solvent which is subject to depletion and which increases in viscosity as a result of said depletion.

In the embodiment shown the container 10 is provided with a cover 12 to which an air motor 13 is attached. The air motor 13 is provided with a shaft 14 which extends downwardly into the liquid 9 and carries at its lower end a disc 15.

A spool 16 is journalled for rotation about the shaft 14 by means of ball bearings 17 and carries a sleeve 18 which surrounds the shaft 14 and has attached thereto at its lower end a disc 20 having a plurality of holes 21 therein for the purpose to be described. A similar disk 22 having a central opening 23 is disposed below the rotary disk 15 and is attached to the disk 20 by means of spacer bolts 24. The disks 20 and 22 are disposed closely adjacent and on opposite sides of the disk 15 and are subjected to a viscous drag when the disk 15 is rotated, the magnitude of which depends upon the viscosity of the liquid 9.

An air line 25 having a control valve 26 and a pressure regulator valve 27 is connected to supply air under a substantially constant pressure for driving the air motor 13. A pressure gauge 28 is provided for indicating the pressure of the air supplied to the motor 13. The motor 13 is maintained at a constant speed of rotation by a governor 30 of standard construction which is driven by the motor shaft through worm gear 31. The motor 13 is supplied with lubricating oil from a reservoir 32 through a pipe 33 to which is connected a vent pipe 34 in the usual manner.

The air line 25 is connected by a pipe 38 to supply air under said constant pressure to the top 39 of a tank 40 containing a liquid 41 such as a solvent which is to be fed into the liquid 9 for viscosity control purposes.

The pipe 38 is also connected by a lead 42 to the intake passage 43 of a pressure regulator valve 44 having a valve member 45 cooperating with a valve seat 46 and connected to be actuated by a diaphragm 47 to control the flow of air from the intake passage 43 to an outlet passage 48. The diaphragm 47 is acted upon by a spring 49 in a direction to open the valve, the compression of which is adjusted by an adjusting handle 50 moving over a scale 51. A light counteracting spring 52 opposes the spring 49. The combined effect of the springs 49 and 52 determines the pressure in the outlet passage 48.

A cable 53 is attached to the spool 16 and to one end of an arm 54 which is attached to a shaft 55. The shaft 55 is mounted for rotation in ball bearings 56 in a casing 57 which is attached to the cover 12. A spring 58 attached to the arm 54 opposes the pull of the cable 53. The shaft 55 carries at its upper end an eccentric 60 which is connected to actuate a link 61, pivoted at 62 to a pin 63 attached to the diaphragm 47 and so arranged that the pull of the cable 53 on the arm 54 causes the link 61 to exert a pull on the diaphragm 47 in a direction to close the valve. Hence the pull of the cable 53 opposes the force of the spring 49 operating against the diaphragm 47 and results in a decreased air pressure being produced in the outlet passage 48.

A pipe 65 is connected to the outlet passage 48 and thence to the inlet passage 66 of a valve 67 having a valve member 68 cooperating with a valve seat 69 and controlled by a diaphragm 70 operating against the pressure of a spring 71 which tends to open the valve. An adjusting handle 72 permits the pressure on the spring 71 to be adjusted, thereby adjusting the value of the air pressure at which the valve will close. A pressure gauge 75 is connected in the pipe 65 and is graduated to read directly in viscosity units, the graduations reading in an inverse direction since an increase in viscosity produces a reduction of the air pressure in the pipe 65.

The valve 67 is provided with an outlet passage 67 connected by a pipe 77 to the diaphragm chamber 79 of a valve 80 having a valve member 81 cooperating with a valve seat 82 and held in closed position by a spring 83 which opposes the pressure in the diaphragm chamber 79. A pressure gauge 78 is shown as connected to pipe 77.

The valve 80 is provided with an inlet passage 84 connected by a pipe 85 to receive liquid from the tank 40 and is provided with an outlet passage 86 connected by a pipe 87 to supply the liquid into the container 10 at a point near the axis of the disks 15, 20 and 22.

In the operation of this system the rotation of the disk 15 at constant speed in the liquid 9 produces a viscous drag on the disks 20 and 22 which varies in accordance with the viscosity of the surrounding liquid. This drag tends to rotate the spool 16 and applies tension on the pin 63 of the valve 44 which varies the air pressure in the line 65. Since the pull of the pin 63 is in a direction to oppose the spring 49 it is evident that an increased viscosity results in a reduced air pressure in the line 65 and vice versa.

The valve 67 is normally closed, in which case no air pressure is applied to the line 77. However, when the air pressure in the line 65 is reduced to a point such that the valve 67 opens, air pressure from the line 65 is supplied through the line 77 to the chamber 79 of the valve 80. This air pressure tends to open the valve 80 and establish connection between the pipes 85 and 87 so that solvent liquid then flows from the tank 40 through the pipes 85 and 87 and is added to the liquid 9 in the container 10. This flow of solvent liquid continues intermittently as described below until the viscosity of the liquid 9 in the container 10 has been reduced to the predetermined value.

It has been found that the above described system is dependable and is sensitive to minor changes in the viscosity of the liquid 9 in the container 10. Hence it may be used for maintaining constant viscosity conditions over long periods of time.

It is noted that in this system the spool 16 is mounted on ball bearings riding on a continuously rotating shaft 14. Hence there is no standing friction or "break-away" friction to be overcome in making the initial movement of the spool 16 and the device accurately reflects minor changes in viscosity from a selected reference point. Any desired viscosity condition can be selected and preset by the handles 50 and 72 and when so set is automatically maintained.

In a viscosity control device of the present type there is a tendency toward viscosity over-correction unless special provision is made to avoid this fault. This tendency toward over-correction is due to the fact that the fresh solvent, even when added near the disc, is not instantaneously mixed with the material. Therefore, if the unit feeds the solvent until the correct overall viscosity is reached, too much solvent would have been added.

This fault is corrected in the present unit by causing the solvent to be fed in periodic spurts when the overall viscosity is close to the desired value. These spurts are produced in the device in the following manner. With disc 15 rotating in the material being controlled and the system in equilibrium while the material viscosity increases to the point where solvent addition will be automatically made, the valve 44 holds the pressure in pipe 65 at a level where valve 67, and therefore valve 80, are closed. Then the material viscosity increases to a value such that the pressure in pipe 65 drops to the point where valve 67 opens, thereby opening valve 80 causing a flow of solvent through pipe 87 into the material 9. The flow of air in the pipe 77 and into the diaphragm chamber 79 of the valve 80 creates a further pressure drop in line 65 and in back of diaphragm 47 of valve 44. This lower pressure causes the diaphragm 47 and therefore lever 54 to move to the right. Compressed air from pipe 38 flows through valve 44 into pipes 65 and 77, both of which have minute controlled air vents (not shown) and closes valve 67 allowing valve 80 to close and shut off the solvent flow through the pipe 87. Valve 44 momentarily remains open due to the intertia of lever 54 and its linkage. During this period the recently added solvent is being mixed with the material 9. Lever 54 then drifts into equilibrium position and if the material viscosity is still too high causes a repetition of the above cycle. If the viscosity is correct the lever 54 and diaphragm 47 remain in equilibrium position.

Although a specific embodiment has been shown it is obvious that the invention is capable of various uses and that changes and adaptations may be made therein as will be apparent to a person skilled in the art.

What is claimed is:

1. A device responsive to changes in viscosity of a liquid, comprising a member mounted to rotate in said liquid, means driving said member at a constant speed, an independently rotatable member mounted within the range of viscous influence of said first member and subject to a viscous drag produced by rotation of said first member, means constraining said second member to produce a torque proportional to said viscous drag, a line carrying air under pressure, a pressure regulating valve connected to control the air pressure in said line, and means responsive to said torque to adjust said valve so as to vary said pressure as a function of said torque.

2. A device responsive to changes in viscosity of a liquid, comprising a member mounted to move in said liquid, an independently movable member disposed in said liquid within the range of viscous influence of said first member and movable in response to viscous drag produced by movement of said first member, means constraining said second member to produce a force proportional to said viscous drag, means including a pressure regulating valve responsive to variations in said force for producing a fluid pressure which varies as a function of said force, a source of viscosity control liquid to be added to said first liquid, means including a valve to control the flow of said viscosity control liquid into said first liquid, and means responsive to a predetermined change in said fluid pressure to open said last valve whereby viscosity control liquid is added to said first liquid to correct the viscosity change thereof.

3. A device responsive to changes in viscosity of a liquid, comprising a member mounted to rotate in said liquid, means driving said member at a constant speed, an independently rotatable member mounted within the range of viscous influence of said first member and subject to a viscous drag produced by rotation of said first member, means constraining said second member to produce a torque proportional to said viscous drag, means including a pressure regulating valve responsive to variations in said torque for producing a fluid pressure which varies as a function of said torque, a source of viscosity control liquid to be added to said first liquid, means including a valve to control the flow of said viscosity control liquid into said first liquid, and means responsive to a predetermined change in said fluid pressure to open said last valve whereby viscosity control liquid is added to said first liquid to correct the viscosity change thereof.

4. A viscosity regulating system for regulating the viscosity of a liquid, comprising a disk mounted to rotate in said liquid, means rotating said disk at a constant speed, a second freely rotatable disk mounted in said liquid within the range of viscous influence of said first disk, means opposing the rotation of said second disk to produce a torque which is a function of the viscosity of said liquid, a source of low viscosity liquid, means including a valve to control the flow of said last liquid into said first liquid for reducing the viscosity thereof, a source of air pressure, means including a control valve to vary said air pressure, means responsive to variations in said torque to actuate said control valve for varying said air pressure as a function of said torque and means responsive to changes in said air pressure to actuate said liquid control valve whereby an increase in viscosity of said first liquid serves to open said control valve for supplying additional low viscosity liquid to said first liquid.

5. A viscosity regulating system for regulating the viscosity of a liquid, comprising a disk mounted to rotate in said liquid, means rotating said disk at a constant speed, a second freely rotatable disk mounted in said liquid within the range of viscous influence of said first disk, means opposing the rotation of said second disk to produce a torque which is a function of the viscosity of said liquid, a source of low viscosity liquid, means including a liquid control valve to control the flow of said last liquid into said first liquid for reducing the viscosity thereof, a source of air pressure, means including a pressure control valve to vary said air pressure, means responsive to variations in said torque to actuate said pressure control valve for varying said air pressure inversely as said torque, a relay valve responsive to a predetermined reduction in said air pressure and connected to actuate said liquid control valve, whereby a predetermined increase in viscosity of said first liquid serves to open said liquid control valve for supplying additional low viscosity liquid to said first liquid.

(References on following page)

References Cited in the file of this patent

UNITED STATES PATENTS

| | | |
|---|---|---|
| 2,096,222 | Bock | Oct. 19, 1937 |
| 2,457,247 | Lawshe | Dec. 28, 1948 |
| 2,643,543 | Herzog | June 30, 1953 |

FOREIGN PATENTS

| | | |
|---|---|---|
| 47,282 | Norway | Dec. 9, 1929 |
| 51,351 | Norway | Aug. 22, 1929 |
| 510,346 | Great Britain | 1939 |